United States Patent
Bouchet et al.

(10) Patent No.: US 7,258,303 B2
(45) Date of Patent: Aug. 21, 2007

(54) AIRCRAFT PARTITION DESIGNED TO SEPARATE A CARGO PART FROM A COCKPIT OR FROM A PASSENGER COMPARTMENT

(75) Inventors: Eric Bouchet, Aussonne (FR);
Benjamin Mahieu, Toulouse (FR);
Lionel Juillen, Toulouse (FR); Frederic Vinches, Larra (FR)

(73) Assignee: Airbus France, Toulouse (FR)

( * ) Notice: Subject to any disclaimer, the term of this patent is extended or adjusted under 35 U.S.C. 154(b) by 401 days.

(21) Appl. No.: 10/978,368

(22) Filed: Nov. 2, 2004

(65) Prior Publication Data

US 2005/0279887 A1 Dec. 22, 2005

(30) Foreign Application Priority Data

Nov. 24, 2003 (FR) .................................. 03 50892

(51) Int. Cl.
*B64C 1/10* (2006.01)

(52) U.S. Cl. ................... 244/118.1; 244/133; 244/121; 52/783.17; 52/783.19

(58) Field of Classification Search ............... 244/119, 244/120, 121, 123.12, 129.4, 133, 118.1; 109/80; 428/182; 410/87; 52/783.11, 783.15, 52/783.17, 783.18, 783.19, 790.1, 798.15

See application file for complete search history.

(56) References Cited

U.S. PATENT DOCUMENTS

| 1,808,842 | A | * | 6/1931 | Fedor ..................... 244/123.12 |
| 2,258,858 | A | * | 10/1941 | Meadowcroft .............. 428/594 |
| 2,330,219 | A | * | 9/1943 | Kemmer ..................... 244/133 |
| 2,407,059 | A | * | 9/1946 | Crafton ........................ 404/35 |
| 2,412,778 | A | * | 12/1946 | Kosek ......................... 244/120 |
| 4,957,250 | A | | 9/1990 | Hararat-Tehrani |
| 5,085,382 | A | | 2/1992 | Finkenbeiner |
| 5,482,230 | A | | 1/1996 | Bird et al. |
| 6,129,311 | A | * | 10/2000 | Welch et al. ........... 244/117 R |

FOREIGN PATENT DOCUMENTS

| GB | 534316 | 3/1941 |
| GB | 824823 | 12/1959 |

* cited by examiner

*Primary Examiner*—Rob Swiatek
(74) *Attorney, Agent, or Firm*—Oblon, Spivak, McClelland, Maier & Neustadt, P.C.

(57) ABSTRACT

An aircraft includes a partition designed to separate a cargo part from a cockpit or a passenger compartment. The partition includes a corrugated structure, defining several corrugations with an approximately omega section extending along the direction of the height of the partition. The partition also includes one or several stiffener elements.

10 Claims, 5 Drawing Sheets

AIRCRAFT PARTITION DESIGNED TO SEPARATE A CARGO PART FROM A COCKPIT OR FROM A PASSENGER COMPARTMENT

DESCRIPTION

1. Technical Domain

This invention relates in general to the domain of devices for separation of a cargo part and a cockpit or passenger compartment of an aircraft used to transport freight.

2. State of Prior Art

In an aircraft designed and used to transport freight in a cargo part, there is usually a separation device between this cargo part and the cockpit of the aircraft when this aircraft is used entirely as a cargo aircraft, or a separation device between this same cargo part and a passenger compartment when the aircraft concerned is for mixed use, namely to transport freight and passengers.

In a known manner, the purpose of the separation device is to protect passengers or members of the crew depending on the configuration of the aircraft concerned, being designed to stop the transported load when it is subjected to an acceleration less than or equal to a maximum acceleration expected in the flight domain of this aircraft.

Several solutions have been proposed according to prior art for making such a separation device.

A first solution consisted firstly of designing a net to retain the freight to stop it from entering the cockpit or the passenger compartment when this transported load is accelerated, particularly as described in document U.S. Pat. No. 6,244,803.

However, there is a serious disadvantage with this solution, which is that the net can deform significantly under the effect of forces applied by the transported load retained by this net when this load is accelerated. For example, this deformation may be as much as several tens of centimetres in a wide body carrier transporting heavy loads. Thus, it is clear that the part of the cockpit or passenger compartment into which the net can deform due to forces transmitted by the transported load retained by the net, cannot be used usefully. Consequently, the use of such a net results in non-optimised space being taken up in the cockpit or the passenger compartment of the aircraft.

To overcome this problem, another solution has been proposed consisting of replacing the net by a rigid partition with small deformation, of the metallic plate type with a relatively large thickness. However, although this partition can advantageously reduce the space occupied directly as a result of use of the separation device, its mass is significantly greater than the mass of the initial solution of a net. Furthermore, it is obvious that as the transported load increases, the mass of the partition must also increase, which means that this solution is not very satisfactory.

Moreover, some partitions have been provided with a cellular structure, for example by arranging the structure between two outside walls of the partition, in order to reduce the mass of the separation device, and particularly with the obvious purpose of being able to increase the transported load.

However, mainly when the aircraft concerned is a wide body carrier and the freight being transported is heavy, the mass of the partition with a cellular structure is still relatively high due to the mechanical strength that it needs to protect crew members located in the cockpit, or passengers inside their compartment.

PRESENTATION OF THE INVENTION

Therefore, the purpose of the invention is to propose a partition for an aircraft designed to separate a cargo part from a cockpit or from a passenger compartment in this aircraft, this partition at least partially solving the disadvantages mentioned above with embodiments according to prior art.

The purpose of this invention is also to present an aircraft with at least one such partition.

To achieve this, the first purpose of the invention is a partition for an aircraft designed to separate a cargo part from a cockpit or a passenger compartment of this aircraft, this partition comprising a corrugated structure comprising several corrugations with an approximately omega section, each corrugation extending approximately along the direction of the height of the partition, and at least one stiffener element being added onto the corrugated structure.

Advantageously, the corrugated structure designed to make the partition according to the invention is such that the global mass of the partition is less than the global mass of partitions with a cellular structure according to prior art described above, while remaining capable of protecting the occupants of the aircraft from the same transported load. Consequently, note that the presence of at least one stiffener element on the corrugated structure makes a significant contribution to reducing the global mass of the partition.

Note that the various geometric parameters of the partition according to the invention, such as dimensions of the constituent element(s) of the corrugated structure, are determined so as to obtain a sufficiently strong partition to resist the maximum transported load subjected to an acceleration equal to at least the maximum acceleration to which it may be subjected within the defined flight range for the aircraft concerned.

As an illustrative example, knowing the maximum forces to be resisted and the dimensions of the partition, the different characteristics of the partition may be determined analytically by carrying out successive calculations, for example using the finite element method, or a topological optimisation method.

Furthermore, the partition according to this invention has the advantage of having extremely low deformations similar to those achieved in prior art with a conventional cellular structure partition, these deformations being much less than the deformations obtained with a net solution. Consequently, the size of the cockpit of the aircraft or the passenger compartment of this aircraft may be significantly optimised.

Preferably, each of the several corrugations with an approximately omega section is made using several plane plates.

Preferably, each stiffener element extends approximately along the direction of the height of the partition.

In this respect, each stiffener element may be in the form of a plane plate.

Furthermore, the corrugated structure comprises a first outside surface and a second outside surface opposite the first outside surface and each of the first and second outside surfaces has an alternation of relief and recesses.

With this configuration, a partition can be designed such that it also comprises at least one external wall bearing in contact with the relief of one of the outside surfaces of the corrugated structure. Once again, each external wall may be in the form of a plane plate.

Preferably, the corrugated structure is arranged between two external walls laid out parallel to each other.

Finally, it would also be possible for at least one secondary stiffener element to be added onto at least one external wall, and for the partition to be made of carbon fibres.

Another purpose of the invention is an aircraft comprising at least one partition separating a cargo part from a cockpit or a passenger compartment of this aircraft, at least one partition separating a cargo part from the cockpit or a passenger compartment being a partition like that presented above and also a subject of this invention.

Preferably, at least one partition separating a cargo part from the cockpit or a passenger compartment is fixed to the fuselage of this aircraft only by an upper edge and a lower edge of the partition. The advantage of this specific feature is that it reduces forces transmitted to the fuselage by the attachment devices used.

Other advantages and characteristics of the invention will become clear in the detailed non-limitative description given below.

BRIEF DESCRIPTION OF THE DRAWINGS

This description will be given with reference to the attached drawings among which.

DETAILED PRESENTATION OF PREFERRED EMBODIMENTS

Figure 1:
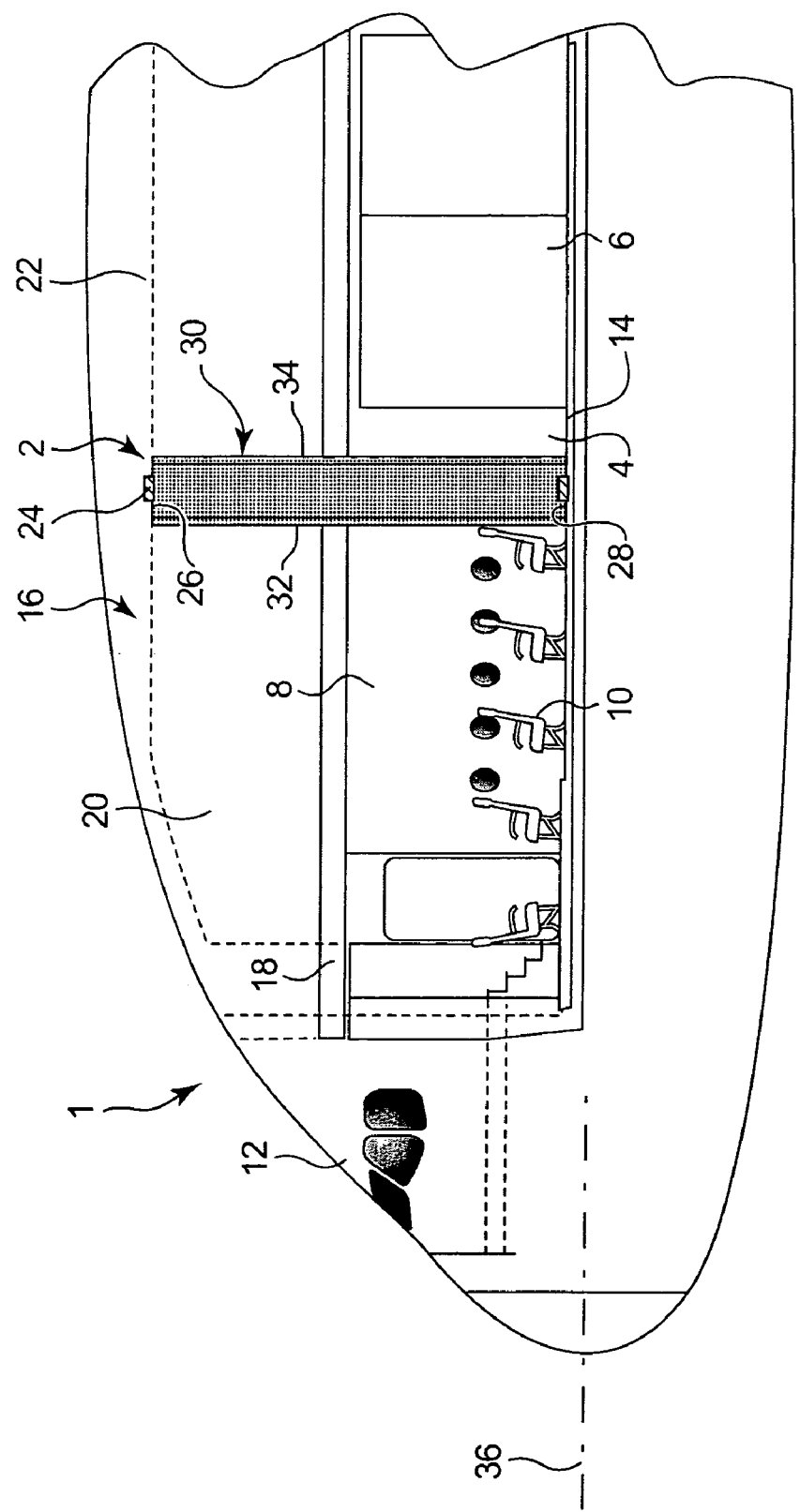
FIG. 1 shows a partial diagrammatic view of the side of an aircraft comprising a partition according to a first preferred embodiment of this invention, this partition separating a cargo part from a passenger compartment.

FIG. 1 shows an aircraft 1 for mixed use, namely designed to transport both freight and passengers, this aircraft 1 being equipped with a partition 2 according to a first preferred embodiment of this invention.

As mentioned above, note that the aircraft 1 is also a subject of this invention. In the preferred example presented in FIG. 1, the aircraft 1 is designed such that the partition 2 is inserted between a cargo part 4 inside which the freight 6, also called the transported load, may be placed, and a passenger compartment 8 forwards from the cargo part 4 and provided with several seats 10. Obviously, in a case not shown in which the aircraft 1 is designed solely to transport freight 6, and therefore does not have a passenger compartment 8, the partition 2 will be placed between the cargo part 4 and the cockpit 12 adjacent to it.

As can be seen in FIG. 1, the partition 2 extends vertically between a main floor 14 and an upper part of a fuselage 16 of the aircraft 1, passing through an intermediate floor 18 parallel to and above the main floor 14. In this respect, note that in the description the terms "vertical" and "horizontal" mean perpendicular to and parallel to the main floor 14 of the aircraft 1, respectively.

Naturally, the partition 2 could only extend between the main floor 14 and the intermediate floor 18 both delimiting the cargo part 4 and the passenger compartment 8, or it could extend only between this intermediate floor 18 and the top part of the fuselage 16, without going outside the scope of the invention. On the other hand, in the preferred example shown in FIG. 1 in which the partition 2 extends beyond the intermediate floor 18, the portion of this partition 2 arranged between this intermediate floor 18 and the fuselage 16 separates two compartments 20 and 22 that could be used to store freight 6, in the same way as the previously described cargo part 4. In this respect, note that it would also be possible to provide two separate partitions 2 designed to equip each of the two levels separated by the intermediate floor 18, respectively. In this case, the two partitions 2 would obviously not necessarily be superposed in height.

In order to firmly fix the partition 2 to the rest of the aircraft structure 1, attachment devices 24 are provided between this partition 2 and particularly the fuselage 16, one example embodiment of the attachment device 24 being shown in FIG. 6 and described later.

However, the devices 24 could for example be of the type including mechanical stops installed using bolts onto rails perpendicular to the partition 2 and fixed to it. In this case, the stops are then preferably designed to rest in contact with the fuselage 16 or the main floor 14, and are assembled to one of these elements 14, 16, also using bolts.

Thus, in order to reduce the forces transmitted to the fuselage 16 by the attachment devices 24, it would be possible for the partition 2 to be fixed only at its upper edge 26 to the top part of the fuselage 16, and at its lower edge 28 to the main floor 14.

Still with reference to FIG. 1, the partition 2 according to the first preferred embodiment of the invention is composed exclusively of a corrugated structure 30 on which at least one stiffener element is added (not visible in this FIG. 1), this structure 30 having a front side 32 delimiting the passenger compartment 8, and a rear side 34 delimiting the cargo part 4 of the aircraft 1.

In this respect, note that the corrugated structure 30 is arranged vertically and is in the general shape of a layer perpendicular to a longitudinal direction of the aircraft 1 shown diagrammatically by the axis 36.

Figure 2:
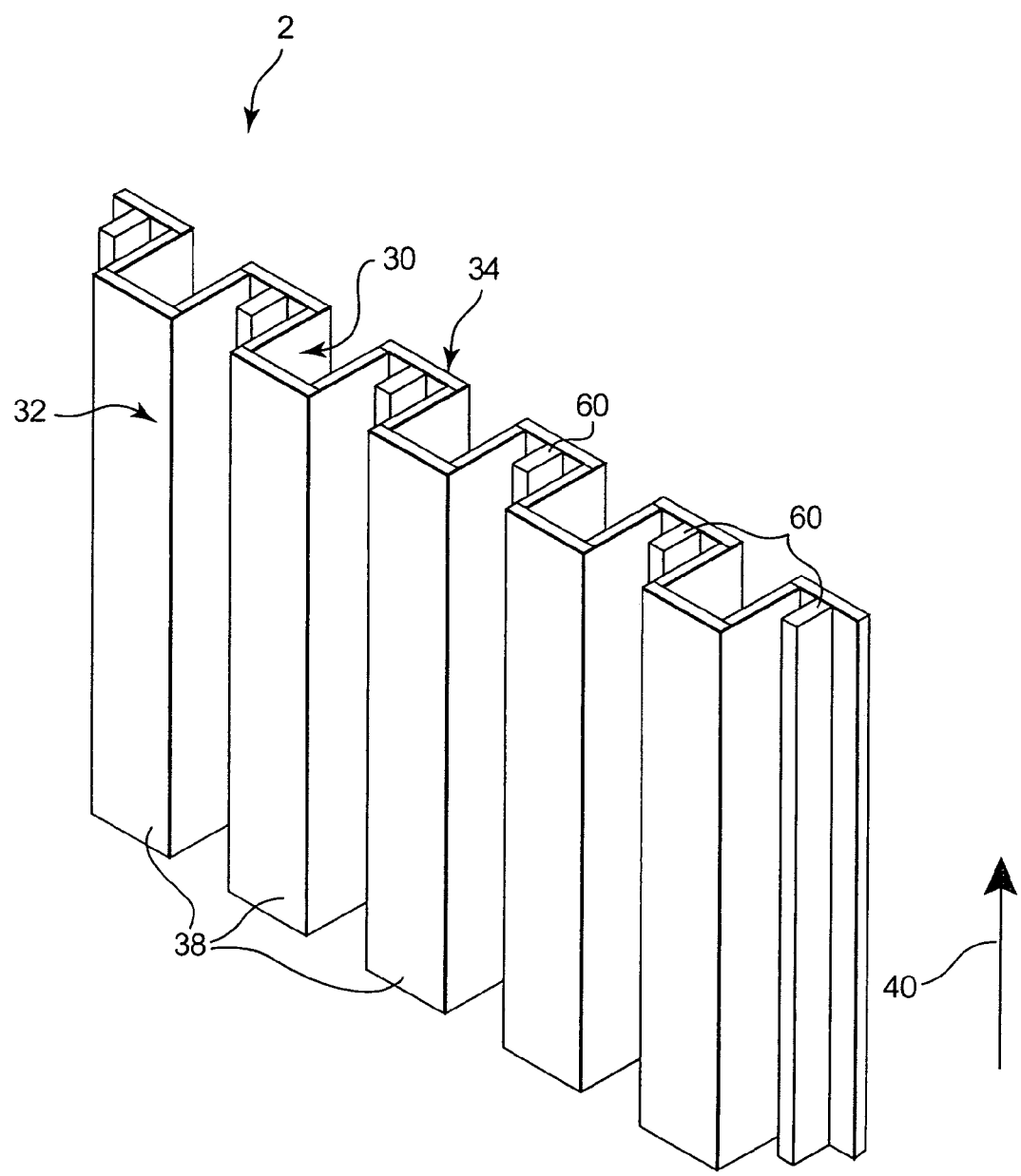
FIG. 2 shows a perspective view of the partition shown in FIG. 1.

Now with reference to FIG. 2, it can be seen that the corrugated structure 30 that can be inscribed in a generally parallelepiped shape, defines several corrugations 38 parallel to each other and each extending approximately along a direction of the height of the partition 2, shown diagrammatically by the arrow 40. Furthermore, as can be seen better in FIGS. 3a and 3b that will be presented in more detail below, the corrugations 38 have an approximately omega shaped section.

Moreover, the partition 2 has one or several stiffener elements 60 that preferably extend along the direction of the height, and are added onto the structure 30, for example only at the rear side 34 of the structure, as shown in FIG. 2. In this respect, note that the stiffener elements 60 are preferably arranged according to the second preferred embodiment described later.

Figure 3A:
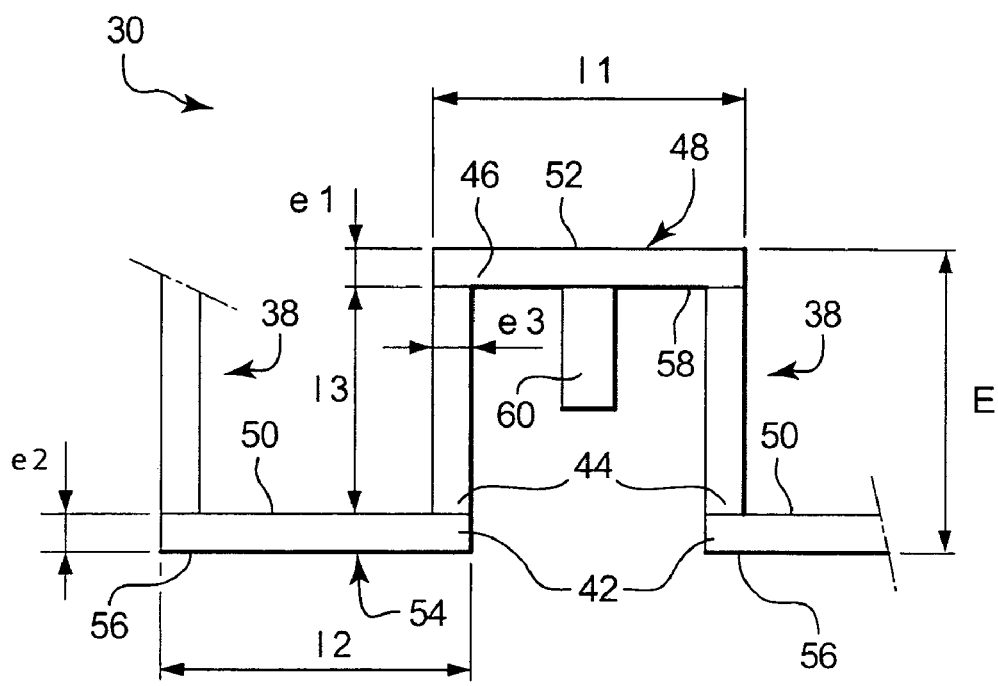
FIG. 3a shows a partial top view of FIG. 2.

Firstly with reference to FIG. 3a showing a corrugation 38 seen from above the corrugated structure 30, it can be seen that this corrugation 38 is made using several plane plates arranged vertically and fixed to each other, for example by welding. As mentioned above, note that the plane plates forming the corrugation 30 are arranged so as to define an omega section shape in a horizontal plane.

This is done by providing each corrugation 30 firstly with two aft plates 42 arranged perpendicular to the longitudinal direction 36 of the aircraft 1. The base of the omega is formed by arranging these aft plates 42 at a spacing from each other, but in the same fictitious plane (not shown). Furthermore, the corrugation 30 comprises two intermediate plates 44 parallel to each other and to the longitudinal direction 36 of the aircraft 1, these two intermediate plates 44 being designed to form the vertical branches of the omega being fixed to the corresponding two aft plates 42. Finally, the corrugation 30 is provided with a front plate 46 forming the top of omega, this front plate 46 then obviously being fixed to the two intermediate plates 44 and arranged perpendicular to the longitudinal direction 36 and to these same two intermediate plates 44.

Furthermore, as is quite clear in FIG. 3a, note that each aft plate 42 can be used to define two directly consecutive corrugations 38. In other words, the aft plates 42 also form the junction between the different corrugations 38 of the corrugated structure 30.

Preferably, the plates 42, 44, 46 are fixed in pairs at their corresponding ends, and each is made of carbon fibres. Nevertheless, these plates 42, 44, 46 could be made from any rigid material without going outside the scope of the invention.

In this first preferred embodiment of this invention, the corrugated structure 30 defined by the plates 42, 44, 46 comprises a first outside surface 48 forming the front side 32 of the partition 2, and consequently delimiting the passenger compartment 8 of the aircraft 1. Thus, due to the presence of the corrugations 38 with an approximately omega shaped section, the first outside surface 48 has an alternation of relief 52 and recesses 50.

Similarly, the corrugated structure 30 comprises a second outside surface 54 forming the rear side 34 of the partition 2 and therefore delimiting the cargo part 4 of the aircraft 1. Thus, once again, the second outside surface 54 has an alternation of relief 56 and recesses 58.

Figure 3B:
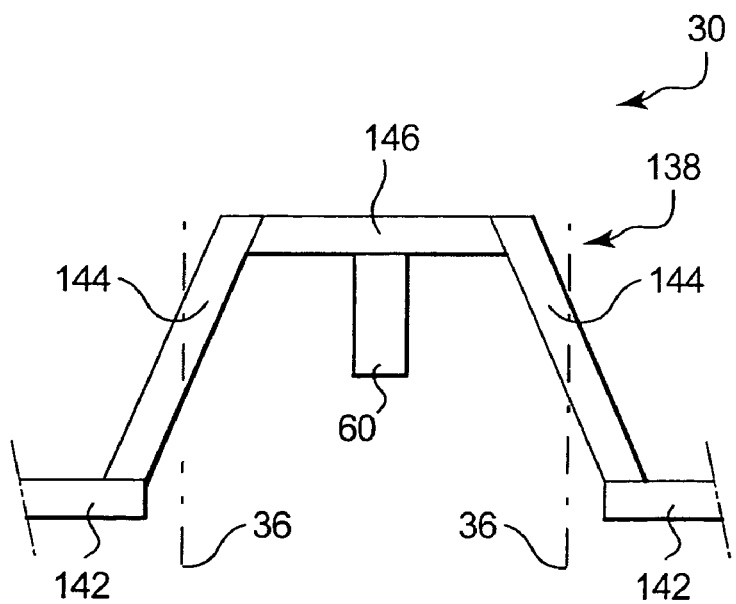
FIG. 3b also shows a partial top view of FIG. 2, when the partition is an alternative form of the first preferred embodiment.

Now with reference to FIG. 3b showing a top view of an alternative form of the first preferred embodiment of the corrugated structure 30, it can be seen that the only difference between the corrugations 38 described above and the corrugations 138 is their shape.

These corrugations are always made using plane plates including two aft plates 142, two intermediate plates 144, and a front plate 146. In this context, note that if the arrangement of the aft plates 142 and the front plate 146 is approximately the same as the arrangement used for the aft plates 42 and the front plate 46 respectively, the intermediate plates 144 are arranged slightly differently from the intermediate plates 44 in FIG. 3a.

The intermediate plates 144 are always arranged vertically, but they are more parallel to the longitudinal direction 36 of the aircraft 1. Therefore the plates 144 are positioned so as to remain vertical while being inclined from the longitudinal direction 36, this inclination from the longitudinal direction 36 preferably being identical for each of the plates 144, and for example of the order of 45°. Furthermore, two directly consecutive intermediate plates 144 with an arbitrary shape are inclined in opposite directions as can be seen in FIG. 3b, so that the plates 142, 144, 146 define several adjacent "trapeziums".

Note that the structures 30 of FIGS. 3a and 3b are made using elements 42, 44, 46, 142, 144 and 146 assembled to each other for example by welding, or possibly by riveting, providing overlapping parts. These structures 30 could also be made using a single corrugated plate in an appropriate manner.

With reference to the dimensions given in FIG. 3a, a preferred example production of the corrugated structure 30 is given that does not take account of the presence of the stiffener elements 60.

Figure 4:
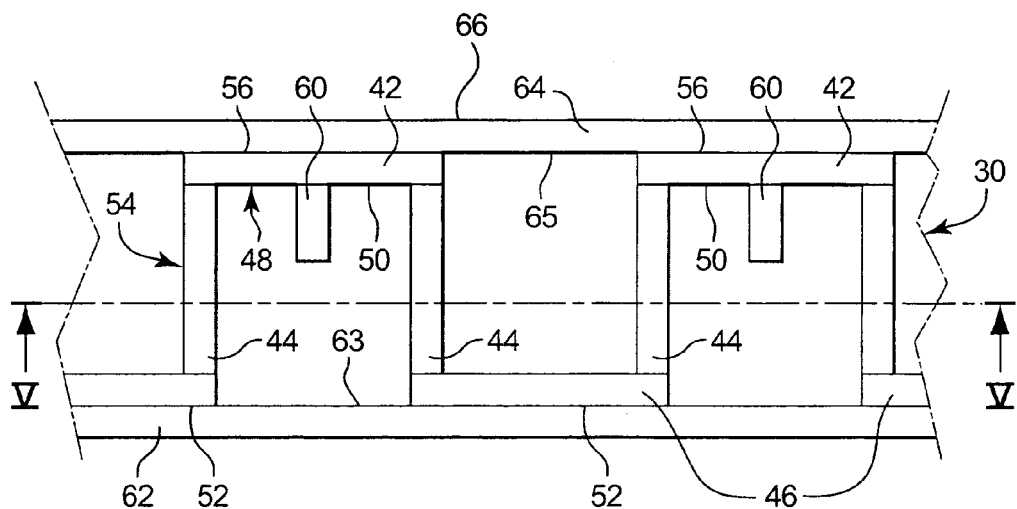
FIG. 4 shows a top view of a partition according to a second preferred embodiment of this invention.
Figure 5:
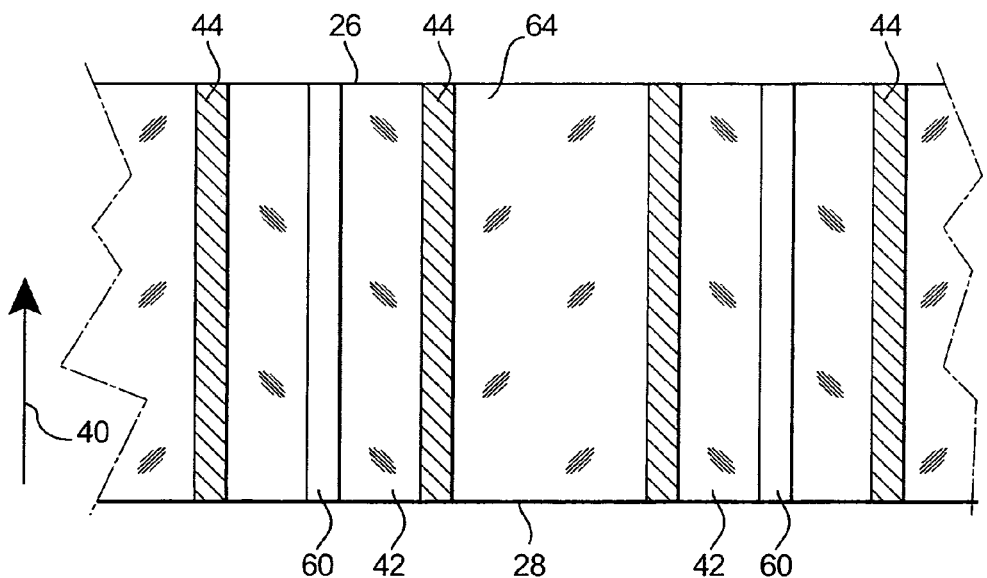
FIG. 5 shows a sectional view taken along line V-V in FIG. 4.

Height "H" of the corrugated structure 30: 2500 mm
Length "L" of the corrugated structure 30: 4800 mm
Thickness "E" of the corrugated structure 30: 316 mm
Thickness "e1" of the front plates 46: 7 mm
Thickness "e2" of the aft plates 42: 7 mm
Thickness "e3" of the intermediate plates 44: 13 mm
Width "11" of the front plates 46: 206 mm
Width "12" of the aft plates 42: 206 mm
Width "13" of the intermediate plates 44: 301 mm
Material used for the plane plates 42, 44, 46: carbon fibres
Mass per unit area of the corrugated structure 30: 25 kg/m$^2$
Global mechanical strength of the corrugated structure 30: 0.7 MPa FIGS. 4 and 5 show a partition 2 according to a second preferred embodiment of this invention.

The partition 2 preferably includes a corrugated structure 30 identical to or similar to that described above and shown in FIGS. 1 to 3a.

Thus, one or several stiffener elements 60 are added onto this corrugated structure 30, and more particularly on the aft elements 42, at the recesses 50 of this first outside surface 48.

These stiffener elements 60 installed fixed on the first outside surface 48 of the corrugated structure 30, preferably by welding, may each be in the form of a plane approximately rectangular plate, for example made of carbon fibres. Nevertheless, these stiffener elements 60 may be made from any other rigid material without going outside the scope of the invention.

The stiffener elements 60 all extend along the direction of the height 40 of the partition 2, preferably over approximately the entire height of this partition 2. Thus, these elements 60 arranged vertically are arranged so as to define parallel and straight lines between the lower edge 28 and the upper edge 26 of the partition 2. Preferably, each aft element 42 is provided with a single stiffener element 60.

Naturally, the arrangement, the length and the number of stiffener elements 60 may be defined so as to obtain a partition 2 that has sufficient mechanical strength to resist the maximum transported load, subjected to an acceleration equal to at least the maximum acceleration to which it may be subjected within the defined flight range for the aircraft concerned.

Furthermore, it has been noted that with the addition of these stiffener elements 60 on the aft plates 42, the mass per unit area of the partition 2 may be reduced from 25 kg/m$^2$ to less than 20 kg/m$^2$, while providing the same global mechanical strength.

As can be seen better in FIG. 4, the stiffener elements 60 in the form of strips and made using plane plates, are installed fixed on the recesses 50 such that these stiffener elements 60 are perpendicular to the aft plates 42. In other words, the stiffener elements 60 are in contact with the first outside surface 48 at their longitudinal edge.

Still in this second preferred embodiment of this invention, the partition 2 could be provided with two external walls 62, 64 sandwiching the corrugated structure 30 and delimiting the passenger compartment 8 and the cargo part 4 of the aircraft 1, respectively.

Thus, a forward external wall 62 is provided with an internal surface 63 in contact with the relief 52 of the first outside surface 48 of the corrugated structure 30, while an aft external wall 64 has an internal surface 65 in contact with the relief 56 of the second outside surface 54 of this same corrugated structure 30. Preferably, the relief 52,56 is fixed to the internal surfaces 63,65 by welding.

Still for guidance, the external walls 62,64 are each in the form of a plane plate covering the entire corrugated structure 30, and are made from carbon fibres. Nevertheless, once again, these external walls 62,64 could be made from any other rigid material without going outside the scope of the invention.

Moreover, note that the external walls 62,64 may also be provided with secondary stiffener elements (not shown), still in order to reduce the global mass of the partition 2 and/or to increase its global mechanical strength, so that it can resist freight 6 that could apply pressure on an outside surface 66 of the aft external wall 64 when this freight 6 is accidentally detached from its storage location.

Naturally, the partition 2 according to this invention could be provided with external walls 62, 64 without necessarily having stiffener elements 60 and secondary stiffener elements.

Figure 6:
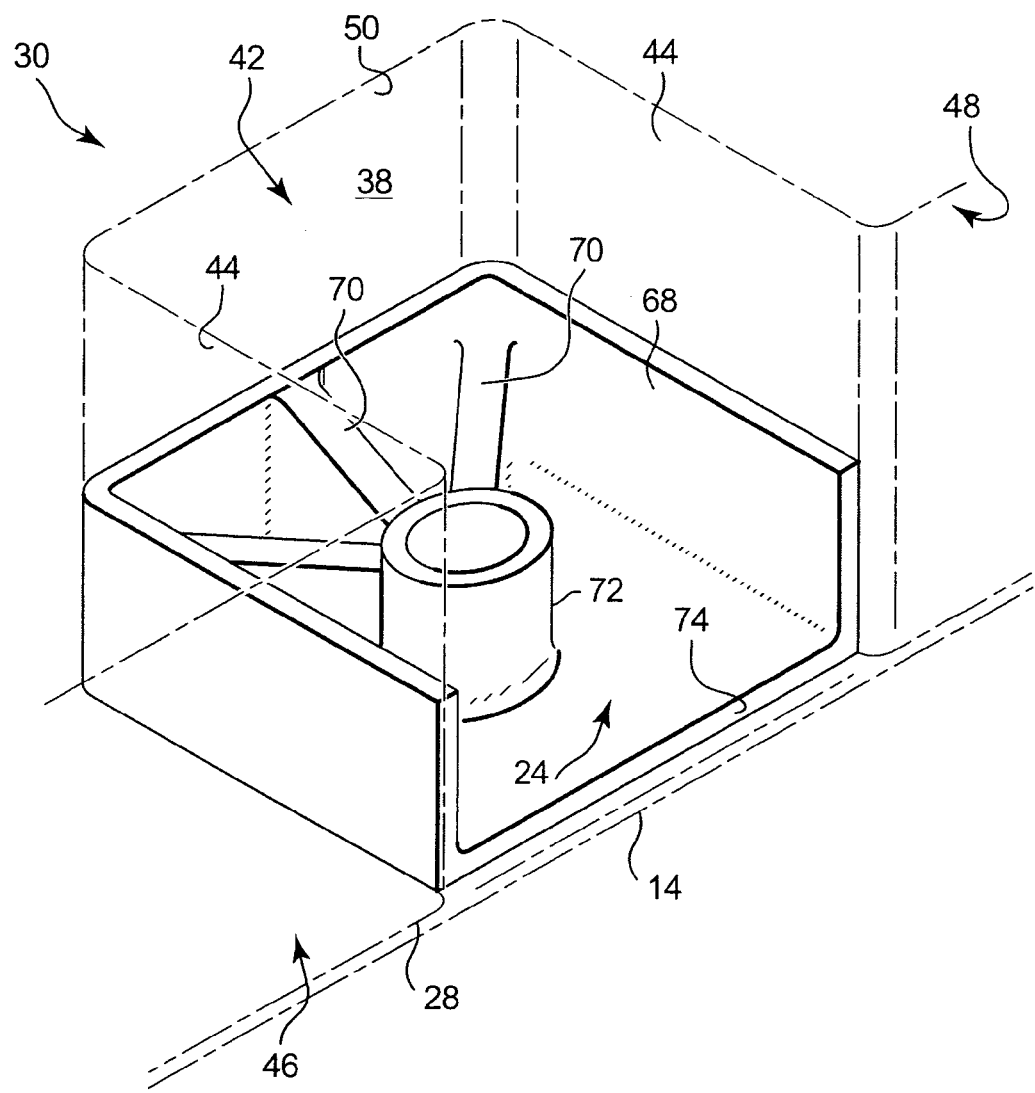
FIG. 6 shows a partial perspective view of a partition attachment device.

FIG. 6 shows an example of an attachment device 24 that is used to assemble the partition 2 on the remainder of the structure of the aircraft 1. In the special case shown, the attachment device 24 is arranged so as to assemble the lower edge 28 of the partition 2 to the main floor 14 of the aircraft 1, the partition 2 then preferably being designed so as not to contain a forward external wall 62.

As can be seen clearly in FIG. 6, the attachment device 24, called the "finger device", is housed inside a corrugation 38. It comprises a vertical panel 68 with a generally U-shaped section, this vertical panel 68 matching the first outside surface 48 of this corrugation 30. In other words, the vertical panel 68 is provided with three sections in contact with two directly successive intermediate plates 44 and the aft plate 42 located between these two intermediate plates 44, and fixed to them for example by welding.

Furthermore, ribs 70 are formed between the vertical panel 68 and a vertical bushing 72 in the device 24 formed inside the U formed by this same vertical panel 68, the bushing 72 resting on a drilled horizontal support 74 also supporting the vertical panel 68.

The assembly formed by the vertical panel 68, the ribs 70, the vertical bushing 72 and the horizontal support 74 may be made in a single piece by casting. Moreover, the device 24 is also provided with hinge pin (not shown) that will cooperate with the vertical bushing 72 and this same main floor 14, to attach this assembly onto the main floor 1.

Obviously, those skilled in the art could make various modifications to the aircraft 1 and to the partitions 2 that have just been described solely as non-limitative examples.

The invention claimed is:

1. An aircraft comprising at least one partition separating a cargo part from a cockpit or a passenger compartment of said aircraft, said partition comprising a corrugated structure defining several corrugations with an approximately omega section, wherein each corrugation extends approximately along the direction of the height of said partition and wherein at least one stiffener element is added onto said corrugated structure.

2. The aircraft according to claim 1, wherein each stiffener element extends along the direction of the height of said partition.

3. The aircraft according to claim 1, wherein each corrugation is made using several plane plates.

4. The aircraft according to claim 1, wherein each stiffener element is in the form of a plane plate.

5. The aircraft according to claim 1, wherein said corrugated structure comprises a first outside surface and a second outside surface opposite to said first outside surface, and wherein each of the first and second outside surfaces has an alternation of relief and recesses.

6. The aircraft according to claim 5, wherein said partition further comprises at least one external wall bearing in contact with the relief of one of said outside surfaces of the corrugated structure.

7. The aircraft according to claim 6, wherein each external wall is in the form of a plane plate.

8. The aircraft according to claim 6, wherein the corrugated structure is arranged between two external walls laid out parallel to each other.

9. The aircraft according to claim 1, wherein the partition is made from carbon fibres.

10. The aircraft according to claim 1, wherein the at least one partition separating the cargo part from the cockpit or the passenger compartment is fixed to the fuselage of said aircraft only by an upper edge and a lower edge of said partition.

* * * * *